United States Patent
Hardesty

(10) Patent No.: US 11,833,606 B1
(45) Date of Patent: Dec. 5, 2023

(54) SOLID STATE DIFFUSION BONDING OF REFRACTORY METALS AND THEIR ALLOYS

(71) Applicant: Peregrine Falcon Corporation, Pleasanton, CA (US)

(72) Inventor: Robert E. Hardesty, Orinda, CA (US)

(73) Assignee: Peregrine Falcon Corporation, Pleasanton, CA (US)

( * ) Notice: Subject to any disclaimer, the term of this patent is extended or adjusted under 35 U.S.C. 154(b) by 0 days.

(21) Appl. No.: 18/127,632

(22) Filed: Mar. 28, 2023

Related U.S. Application Data

(62) Division of application No. 17/472,438, filed on Sep. 10, 2021, now Pat. No. 11,654,504.

(51) Int. Cl.
  *B23K 20/00* (2006.01)
  *B23K 20/02* (2006.01)
  *C22C 27/02* (2006.01)
  *B23K 103/08* (2006.01)

(52) U.S. Cl.
  CPC ............ *B23K 20/023* (2013.01); *C22C 27/02* (2013.01); *B23K 2103/08* (2018.08)

(58) Field of Classification Search
  CPC .... B23K 35/005; B23K 20/023; B23K 20/22; B23K 20/00; B23K 20/021; B23K 35/00
  See application file for complete search history.

(56) References Cited

U.S. PATENT DOCUMENTS

| | | | | |
|---|---|---|---|---|
| 3,431,615 A | * | 3/1969 | Hagadorn | H01J 19/00 313/355 |
| 3,504,426 A | * | 4/1970 | Light, Jr. | C22C 16/00 228/195 |
| 3,591,917 A | * | 7/1971 | Shira | B23K 35/005 228/262.9 |
| 3,714,702 A | * | 2/1973 | Hammond | B23K 35/005 228/122.1 |
| 4,150,776 A | * | 4/1979 | Lesgourgues | B23K 35/004 228/194 |
| 5,615,826 A | * | 4/1997 | Dixon | B23K 35/002 228/208 |
| 6,779,713 B1 | * | 8/2004 | Emmons | B23K 35/002 228/262.1 |

(Continued)

*Primary Examiner* — Erin B Saad
(74) *Attorney, Agent, or Firm* — Mark Protsik; Thomas Schneck

(57) ABSTRACT

A solid-state bonding method sandwiches an intermediate layer between a pair of refractory metal members, e.g., of niobium, tantalum, and alloys, to form a composite bonding assembly. This sandwiching can be repeated with multiple refractory metal members. The intermediate layer is substantially uniform of at most 75 μm thickness and composed of a material that is soluble and diffusive in the refractory metal members, e.g., of iron, nickel, cobalt, chromium, silicon, or carbon. Compressive pressure is applied, and the assembly is heated to a specified elevated temperature of at least 1280° C. The applied pressure and elevated temperature are maintained until the intermediate layer has dissolved surface oxides and asperities in the refractory metal members and has completely diffused into the refractory metal to create a seamless refractory metal bond. The pressures and temperatures needed are much lower than those required in direct diffusion bonding of refractory metals.

12 Claims, 2 Drawing Sheets

(56) References Cited

U.S. PATENT DOCUMENTS

| | | | |
|---|---|---|---|
| 7,850,059 B2* | 12/2010 | Kobayashi | B23K 26/211 228/178 |
| 11,654,504 B1* | 5/2023 | Hardesty | B23K 20/02 228/194 |
| 2018/0304420 A1* | 10/2018 | Zheng | B23K 35/304 |
| 2018/0361501 A1* | 12/2018 | Hardwick | B33Y 10/00 |

* cited by examiner

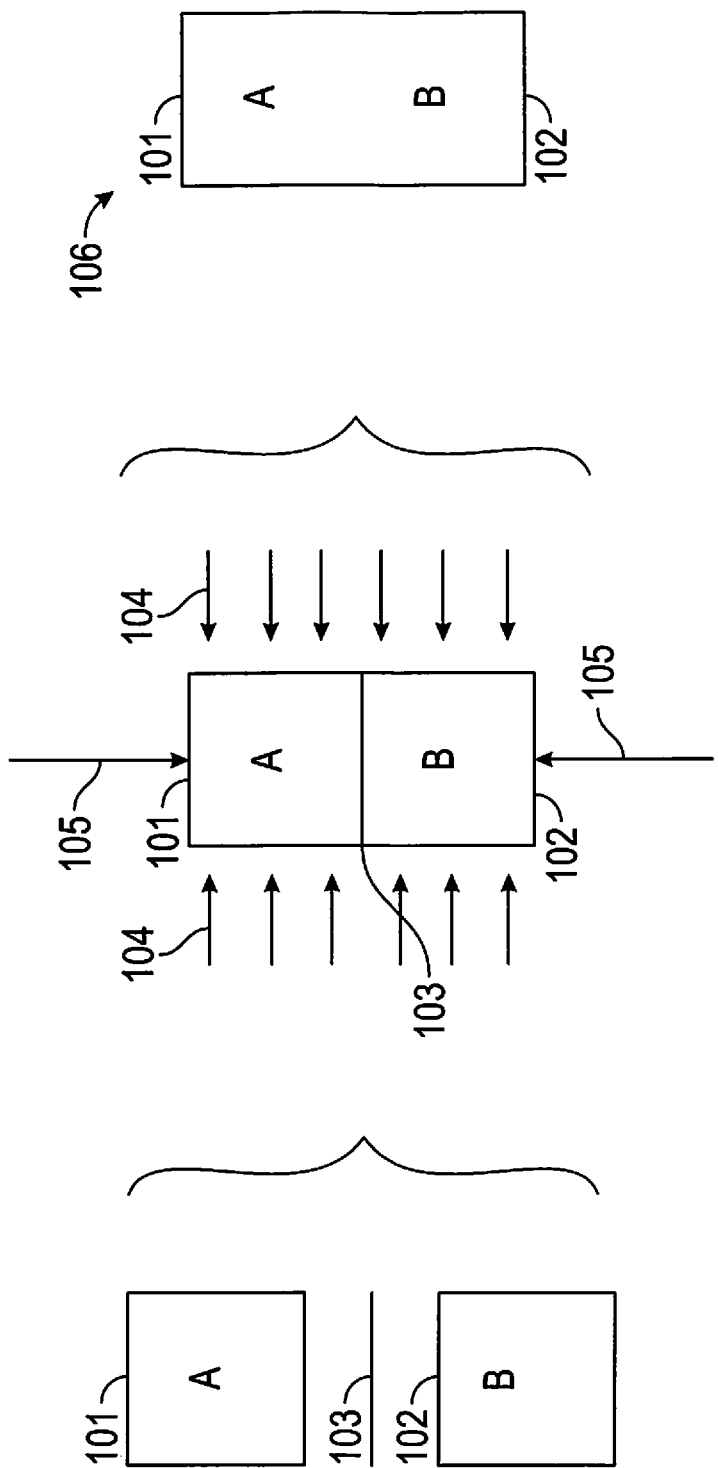

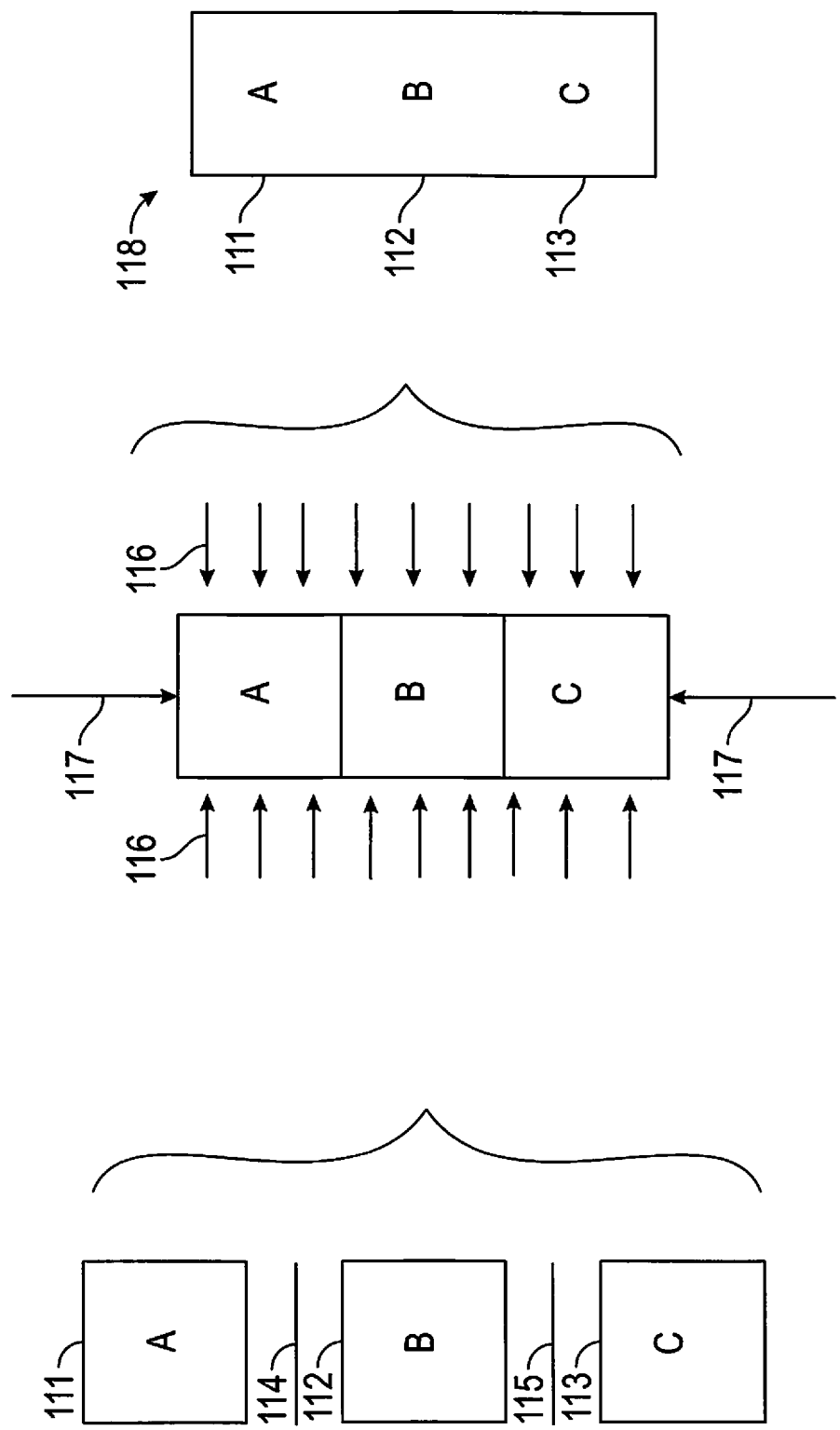

SOLID STATE DIFFUSION BONDING OF REFRACTORY METALS AND THEIR ALLOYS

CROSS-REFERENCE TO RELATED APPLICATION

The present application is a divisional of U.S. patent application Ser. No. 17/472,438, filed Sep. 10, 2021, which claimed priority under 35 U.S.C. 119(e) from U.S. provisional application 63/221,810, filed Jul. 14, 2021.

TECHNICAL FIELD

The invention relates to solid state diffusion bonding of refractory metals (niobium, molybdenum, tantalum, tungsten, and rhenium) and alloys thereof, and more particularly to any techniques that make seamless bonding of such metals possible with a reduction in the applied temperatures and pressures.

BACKGROUND ART

The five metallic elements of niobium (Nb), molybdenum (Mo), tantalum (Ta), tungsten (W), and rhenium (Re) are together known as the refractory metals. Typical of each is their high temperature properties (e.g., melting points above 2400° C.), relatively high densities (greater than 8.5 g/cm 3) and hardness (Vickers hardness greater than 850 MPa). Zirconium (Zr) and hafnium (Hf), especially the latter, are sometimes included in this group, but for the present purposes (except as minor constituents in alloys) they are here excluded. Refractory metals and their alloys are usually used for applications in extreme environments. Some refractory metals or refractory metal alloys are created from powder metallurgy to create specific properties, while others can be cast and worked to create products. In general, they are conventionally processed through machining, grinding, and normal fabrication methods including welding and forming. Because of their expense, their use is limited. In addition, other attributes like high densities do not readily translate to commercial applications.

Products made using refractory metals and their alloys are typically machined or ground monolithic members, although they could be pieces welded or brazed together in some cases. However, welded or brazed bonds between refractory metals tend to be relatively weak. Development of a strong seamless solid-state bond between refractory metals and their alloys to join two or more members into a monolithic assembly is needed. Joining refractory metals and/or alloys of refractory metals is challenging. Refractory metals have very high melting points and typically have high density, high strength, high stiffness, and creep (deformation) resistance.

Many conventional materials, such as titanium (Ti), can be diffusion bonded (a solid-state bond) under high temperatures and pressures. Diffusion bonding is a technique that employs the diffusion of atoms as the main process for the creation of a joint. In a diffusion bond approach, one must bring together members surface-to-surface that are to be joined under high temperature and high pressure with the intent of plastically deforming the interface together to overcome surface imperfections and/or oxide layers to create intimate contact allowing diffusion to occur across the surface boundary. Diffusion bonding involves keeping the workpieces to be joined in close intimate contact under high pressure and heating to elevated temperatures for a specified duration of time. In essence, diffusion bonding is two or more surfaces brought together and then exposed to high temperatures under high pressure to plastically deform the surfaces of the different members into each other to establish intimate surface contact to allow diffusion across the member boundaries to occur.

The conventional diffusion bonding technique occurs in three stages: In stage 1, the materials, under pressure and temperature, plastically deform yielding and creeping into intimate contact. Asperities, at the interface or faying surfaces, deform and the actual mating surfaces grow in total contact increasing intimate metal-to-metal contact. In stage 2, atoms in the contact area diffuse via grain boundaries. This causes a rearrangement of grain boundaries and the elimination of pores in the bonded zone. In the $3^{rd}$ and final stage, volume diffusion dominates, and the bond is formed. The high pressure and temperatures utilized to create a direct diffusion bond is necessary since the surfaces aren't truly in direct contact until very high pressure, at temperature, plastically deforms the materials into each other achieving intimate contact. The high pressure, forces through the surface oxides and the asperities on the surface to create metal-to-metal contact. But, since plastic deformation must occur, one needs to be approaching the liquidus point of the members material.

Accordingly, refractory metals are not usually diffusion bonded to each other. Except at very high temperatures close to their melting points, refractory metals and their alloys do not readily soften sufficiently for plastic deformation to occur in a reasonable timeframe. The joining pressures involved (typically many megapascals or 1000s of psi) could result in damage to any intricate surface structures formed prior to the diffusion bonding.

In U.S. Pat. No. 3,431,631, Hagadorn describes a diffusion bonding method using an iron metal sheath to bond refractory metals like molybdenum or tungsten to themselves or to other metals. A maximum temperature of 900° C. is applied for this joining process and a zone of intermediate material remains within the joint after bonding. Accordingly, a brittle intermetallic zone remains as a potential bond weakness.

In U.S. Patent Application Publication 2010/0261034, Cardarelli describes a lightweight composite with a corrosion-resistant refractory metal outer protective layer that can be attached to the composite core by means of an intermediate layer. The attachment method does not teach the use of pressure or duration to lower the melting point of the different materials to form a bond, nor allowing a sufficient time to diffuse the intermediate layer completely out of the joint. As such, the intermediate material remains as a potential weak point in the attachment of the refractory metal layer to the composite core.

The published Japanese application JP 3-297555A of Fujii and Yamamoto (published Dec. 27, 1991) join refractory metals by interposing cobalt and subjecting to a heat treatment above the eutectic temperature of the refractory metal alloys. The technique simply joins the refractory metals and does not teach the use of pressure or a sustained duration of the heat treatment that would completely dissolve the interlayer. Indeed, the interlayer is mixed with the refractory metal prior to placement between the members to create a joint that can allow some of the mixture to remain without undercutting the joint or creating a negative fillet as it reaches the edge of the joint.

SUMMARY DISCLOSURE

A unique joining process for refractory metals and refractory metal alloys is provided, wherein an intermediate catalyst layer is sandwiched between the base refractory metal bodies to be joined. This intermediate catalyst layer is used to achieve a diffusion bond type metallurgical connection at lower temperatures and lower pressures than a corresponding direct diffusion bond. The intermediate material between the surfaces to be bonded creates a liquid front dissolving the surface oxides and asperities between opposing refractory members, in lieu of conventional diffusion bonding's use of high pressure and near parent metal liquidus temperatures. The intermediate catalyst material allows for metal-to-metal surfaces to come into intimate contact to allow diffusion to occur without the need for high pressure required for direct diffusion bond. One no longer needs member surfaces to plastically yield at the interface into each other. Instead, the intermediate layer performs this function to dissolve the base metal member surfaces allowing them to come into intimate contact and then the interlayer diffuses into the base metal while allowing base metal to metal to remain in contact and diffusion bonding continues to achieve a monolithic structure.

The intermediate catalyst layer is a material that is soluble and diffusive in the refractory metal(s) being joined, and may, for example, be composed of materials selected from any of carbon, silicon, chromium, iron, cobalt, and nickel. For niobium and its alloys, iron and nickel are the best choices. For tungsten and its alloys, cobalt and carbon are the best choices. Tantalum and tantalum alloys may be joined using any of these intermediate layer materials. Using carbon as the intermediate material tends to require a much higher temperature, albeit still lower than that needed for direct diffusion bonding and in less time. The claims set forth in this divisional application recite an iron intermediate layer material, which is suitable for diffusion bonding of niobium metal bodies, as well as tantalum metal bodies, and alloys of the same (such as, e.g., that known as C-103 described below).

The diffusion of the intermediate material produces a seamless join so that resulting structures will have near parent metal properties throughout with solid-state bonds that won't be degraded until the melting point of the member refractory metal and/or refractory alloy is approached.

The need in prior techniques to establish both high pressure and high temperature to initiate direct diffusion bonding prevents the inclusion of channels and lightweight designs of refractory structures, since the pressures and temperatures will deform and/or collapse these intricate details. Typical applied pressures for the present invention range from 10 to 20 psi (70 to 140 kPa), compared to pressures of 500 psi (3.4 MPa) or more that would be needed for direct diffusion bonding of refractory metals. Hence, the present invention allows for intricate structures, e.g., heat exchangers or insulative structures, to be produced from refractory metals and/or their alloys and then be joined without damage to such structures. This intermediate catalyst layer allows for lower temperatures and much lower pressures to be utilized to create a monolithic assembly, allowing for intricate structures to exist between refractory metal and/or refractory alloy members. As a result, one can now create monolithic lightweight structures with an option for intricate assemblies from refractory metals and their alloys where previously only heavier structure could be produced. Likewise, it can allow for integration of channels (e.g., for actively cooled structures) and/or closed out structure like honeycomb or egg crated panels (e.g., to yield lightweight and/or insulative structures) that couldn't be currently produced conventionally.

BRIEF DESCRIPTION OF THE DRAWINGS

FIGS. 1A-1C are side schematic views showing a diffusion bonding sequence of a simple two-member construction using an intermediate catalyst layer in accord with the present invention.

FIGS. 2A-2C are side schematic views showing a diffusion bonding sequence of a multi-layer stack of refractory metal members in accord with the present invention.

DETAILED DESCRIPTION

A method is provided to solid-state bond refractory metals and/or refractory alloys together using an intermediate catalyst initiating diffusion at lower temperatures and pressures than what would be necessary for direct metal to metal diffusion bonding. Solid-state bonding to join two or more members together from refractory metals or refractory metal alloys uses an intermediate layer to depress the diffusion bond point, resulting in metallurgical joining that is representative of diffusion bonding. The intermediate layer or catalyst dissolves surface oxides and asperities to smooth member surfaces to allow diffusion to occur. The method can join refractory metals and/or refractory alloys together to create less than full dense assemblies allowing for the incorporation of light weighted refractory metal or refractory metal alloy members to be part of a solid-state bonded assembly.

With reference to FIGS. 1A-1C, a first "A" refractory metal member 101 and a second "B" refractory metal member 102 are brought together with an intermediate catalyst layer 103. The refractory metal material of members 101 and 102 may be identical or different materials.

Refractory metals include niobium (Nb) (also known as columbium (Cb)), molybdenum (Mo), tantalum (Ta), tungsten (W), and rhenium (Re). A variety of alloys of niobium are known, including Fansteel 80 (99Nb-1Zr), C-103 (89Nb-10Hf-1Ti), Cb-129Y (77.9Nb-10Hf-10W-0.1Y) and Cb-752 (87.5Nb-10W-2.5Zr), wherein the compositions given are nominal values within a specified tolerance.

Additionally, two well-known superconducting niobium alloys are Nb 3 Sn and NbTi. One common alloy of molybdenum is known as TZ Moly or TZM (99.4Mo-0.5Ti-70Mo-30W is another. Tantalum alloys with niobium over a wide range of percentages, such as and likewise with tungsten, such as Tantaloy® (97.5Ta-2.5W or 90Ta-10W). Tungsten alloys with rhenium (up to a solubility limit of 27%), and with nickel, copper and/or iron (e.g., 90W-6Ni-4Cu or 90W-7Ni-3Fe). New alloys are continually being developed for various uses from turbine fan blades to high-temperature piping, and the examples given here are merely a representative sample of possible refractory metal materials that can be successfully joined using the present invention. The refractory metal members to be joined may have a variety of shapes and thicknesses. At the thin end of the range (typically around 1.5 mm or 0.060 inch) for the refractory metal members, care should be taken to ensure that the intermediate catalyst layer is also thin enough for the intermediate layer material to be completely dissolved and diffused into the refractory metal for a seamless bond. The refractory metal members may have fine surface features of, for example, about 250 µm (or 0.010 inch) width and/or thickness. These relatively fragile or delicate features will still retain their shape under the lower applied pressures that the present invention provides. This allows for intricate structures and blind cavities to be integrated into the layup.

The intermediate catalyst layer material can be any of a variety of substances that are both soluble and diffusive within the refractory metal members being joined at elevated temperatures. This includes any of carbon (C), silicon (Si), chromium (Cr), iron (Fe), cobalt (Co), and nickel (Ni). The intermediate catalyst layer material should be as thin as possible, with a thickness in a range from 0.0005" to 0.003" (10 μm to μm), and more preferably with a thickness around (25 μm, within a tolerance of 5 μm). It can be plated, physically deposited, or even laid in as foil. This will ensure a uniform, reproducible, and seamless bond over the entire bonding surface (in comparison with a powder layer, which is nearly impossible to evenly distribute with full coverage and uniform thickness). The choice of intermediate layer material will depend upon several factors, including their diffusivity within the refractory material being joined, the temperatures available, and the strength required of the final bond (any inhomogeneities in composition or crystal structure from any unincorporated intermediate material could weaken the structure). For tungsten, cobalt and carbon are preferred. For niobium, iron and nickel are preferred. Nevertheless, given enough time at the elevated temperatures, any of the material will work. It should be noted that if carbon is used, then the required bonding temperatures will tend to be considerably higher (exceeding 2700° C.) than for any of the other intermediate materials.

Once the layup of "A" refractory metal member 101—intermediate catalyst layer 103—"B" refractory metal member 102 is placed together, the assembly is brought under an applied pressure 105 to a stable elevated temperature via externally applied heat 104 and allowed to stay in these conditions for a specified time of at least 15 minutes, but more usually of at least one hour. Upon the cool down of the assembly and the removal of pressure, the resulting bonded structure 106 will appear near monolithic in cross section. The catalyst has completely dissolved within the refractory base materials and members 101 and 102 have diffused together creating a seamless bond. The purpose of the catalyst layer 103 is to dissolve the oxide and irregular surfaces present bringing the surfaces of A and B refractory base materials 101 and 102 into intimate contact and allow them to diffuse together. Additional diffusion can be obtained by extending the duration at temperature 104 and pressure 105; many hours of duration have been applied for various structural members.

An advantage of using the intermediate catalyst layer material 103 sandwiched between the refractory metal members 101 and 102 is that the required applied pressure 105 and elevated temperature obtained from the applied heat 104 is much less than those required for direct diffusion bonding of refractory metals. In particular, the applied pressure 105 will not need to exceed 500 psi (3400 kPa) and will usually be much less, i.e., under 100 psi (700 kPa) and preferably in a range from 10 to 20 psi (70 to 140 kPa). Except when using carbon intermediate layers, the minimum elevated temperature will generally fall within a range from 1280° C. and 1765° C. The minimum holding time will usually fall within a range from 60 to 120 minutes.

In one example, the two refractory metal members 101 and 102 are both the niobium alloy C-103, which is nominally composed of 89% niobium, 10% hafnium, and 1% titanium, within a tolerance of ±0.5 wt. % for each alloy component. The intermediate catalyst layer 103 is iron (Fe). For this combination, an elevated temperature in slight excess of 1,373° C. is sustained with a minimum applied pressure of 20 psi (140 kPa). Those temperature and pressure conditions are maintained for a period of more than 60 minutes.

In a related example, the refractory metal may be niobium or a niobium alloy, the intermediate layer of iron, the minimum elevated temperature is 1375° C.±5° C., and the minimum diffusion bonding time is 120 minutes (2 hours).

Alternatively, solid-state diffusion bonding of an assembly from two or more members of niobium or niobium alloys can be performed using nickel as the intermediate catalyst layer material at minimum elevated temperatures of 1,290° C.±5° C. for a minimum time of 120 minutes.

Solid-state bonding of an assembly from two or more members of tantalum or tantalum alloys can likewise be achieved with this invention. Using carbon as the intermediate catalyst layer material, the minimum elevated temperature will be 2850° C.±10° C. and the minimum time is 60 minutes. Using silicon in the intermediate layer, the minimum elevated temperature will be 1400° C.±5° C. and the minimum time is 90 minutes. Alternatively, using chromium as the intermediate catalyst material, the minimum elevated temperature is 1765° C.±5° C. and the minimum bonding time is 90 minutes. Still further, using iron as the intermediate layer material, the minimum elevated temperature is 1435° C.±5° C. and the minimum time is 120 minutes. Even further, solid-state bonding of an assembly from two or more members of tantalum alloys using cobalt as an intermediate or catalyst is conducted with a minimum elevated temperature of 1285° C.±5° and a minimum time of 90 minutes. Using nickel as the intermediate catalyst, the minimum elevated temperature is 1355° C.±5° with a minimum time of 90 minutes.

Solid-state bonding of an assembly from two or more members of tungsten or tungsten alloys can likewise be achieved with this invention. Using cobalt as the intermediate catalyst layer material, a minimum elevated temperature is 1475° C.±5° C. and the minimum diffusion bonding time is 90 minutes. Alternatively, using carbon as the intermediate layer material, bonding can be achieved at minimum temperatures of 2720° C.±10° C. held for a minimum time of 60 minutes.

When bonding together members composed of two different refractory metals or alloys, an intermediate layer material that is compatible (i.e., soluble and diffusive) within both refractory materials is used, the greater elevated temperature for the two materials will be applied and for the greater time duration.

With reference to FIGS. 2A-2C, multiple layers 111-113 can be utilized and joined together with the aid of intermediate catalyst layers 114 and 115, either all at once or sequentially with this process. Multiple layers 111-113 could be joined at one time using the process. Alternatively, a solid-state bond could first be created between two members (e.g., 111 and 112) using the intermediate layer 114, allowing for those members to be bonded, and then a subsequent layer 113 could be added with a second intermediate layer 115, followed by a second bond run. Even more bond runs can be performed one after the other. In either case, applied pressure 117 and elevated temperatures from applied heat 116 result in a structure 118 with a seamless bond.

If sequential bonding is employed, because further heating and pressure will be used for the subsequent bond runs, the earlier runs in the sequence need not necessarily be performed for their full duration before continuing to the next run. At the end of all bond runs in the sequence, the final structure will have a seamless bond with the intermediate layers 114-115 completely dissolved and diffused into the refractory base material.

This new process allows for a solid-state bonded assembly to be applied in use up to parent metal property limitations. There are numerous applications and uses of this technology throughout the energy, aerospace, and medical fields.

Although the invention has been described relative to producing a multi-piece solid structure, it could also easily be utilized for joining honeycomb or egg-crated panels, where all such panel members are composed of refractory metals or refractory metal alloys, to thereby create embedded channels or similar structural features that are useful for example in actively and passively cooled designs.

The invention claimed is:

1. A solid-state bonding method, comprising:
    sandwiching an intermediate iron layer between a pair of refractory metal members to form a composite bonding assembly, the intermediate iron layer being substantially uniform of at most 75 μm thickness, the refractory metal members and the intermediate iron layer being mutually soluble and diffusive; and
    applying compressive pressure to and heating to a specified elevated temperature the composite bonding assembly, the pressure being less than 3400 kPa (500 psi) and the elevated temperature being at least 1280° C., the applied pressure and elevated temperature being maintained for at least a minimum time in excess of 15 minutes until the intermediate iron layer has dissolved surface oxides and asperities in the refractory metal members and has completely diffused into the refractory metal to create a seamless refractory metal bond.

2. The solid-state bonding method as in claim 1, wherein the refractory metal members being bonded are composed of any of niobium, tantalum, and alloys thereof.

3. The solid-state bonding method as in claim 2, wherein the refractory metal members include at least one member composed of an alloy of 89% niobium, 10% hafnium, and 1% titanium, within a tolerance of ±0.5 wt. % for each alloy component.

4. The solid-state bonding method as in claim 1, wherein the intermediate layer has a thickness in a range from 10 to 75 μm.

5. The solid-state bonding method as in claim 4, wherein the intermediate layer has a thickness of 25 μm, within a tolerance of 5 μm.

6. The solid-state bonding method as in claim 1, wherein the elevated temperature is at most 1765° C.

7. The solid-state bonding method as in claim 1, wherein the applied pressure is in a range from 70 to 140 kPa (10 to 20 psi).

8. The solid-state bonding method as in claim 1, wherein the elevated temperature and applied pressure are held for a minimum time in a range from 60 to 120 minutes.

9. The solid-state bonding method as in claim 1, wherein the refractory metal is niobium, the elevated temperature is 1375° C.±5° C., and the minimum time is 120 minutes.

10. The solid-state bonding method as in claim 1, wherein the refractory metal is tantalum, the elevated temperature is 1435° C.±5° C., and the minimum time is 120 minutes.

11. A solid-state bonding method, comprising:
    sandwiching an intermediate iron layer between a pair of niobium alloy refractory metal members to form a composite bonding assembly, the intermediate iron layer being substantially uniform of at most 75 μm thickness, the niobium alloy refractory metal members and the intermediate iron layer being mutually soluble and diffusive; and
    applying compressive pressure to and heating to a specified elevated temperature the composite bonding assembly, the applied pressure being in a range from 70 to 140 kPa (10 to 20 psi) and the elevated temperature being 1375° C.±5° C., the applied pressure and elevated temperature being maintained for at least a minimum time of 120 minutes until the intermediate iron layer has dissolved surface oxides and asperities in the niobium alloy refractory metal members and has completely diffused into the refractory metal to create a seamless refractory metal bond.

12. The solid-state bonding method as in claim 11, wherein the niobium alloy refractory metal members include at least one member composed of 89% niobium, 10% hafnium, and 1% titanium, within a tolerance of ±0.5 wt. % for each alloy component.

\* \* \* \* \*